Sept. 17, 1929.   D. W. SMITH   1,728,703
DOUGH ROLLER
Filed Jan. 30, 1928
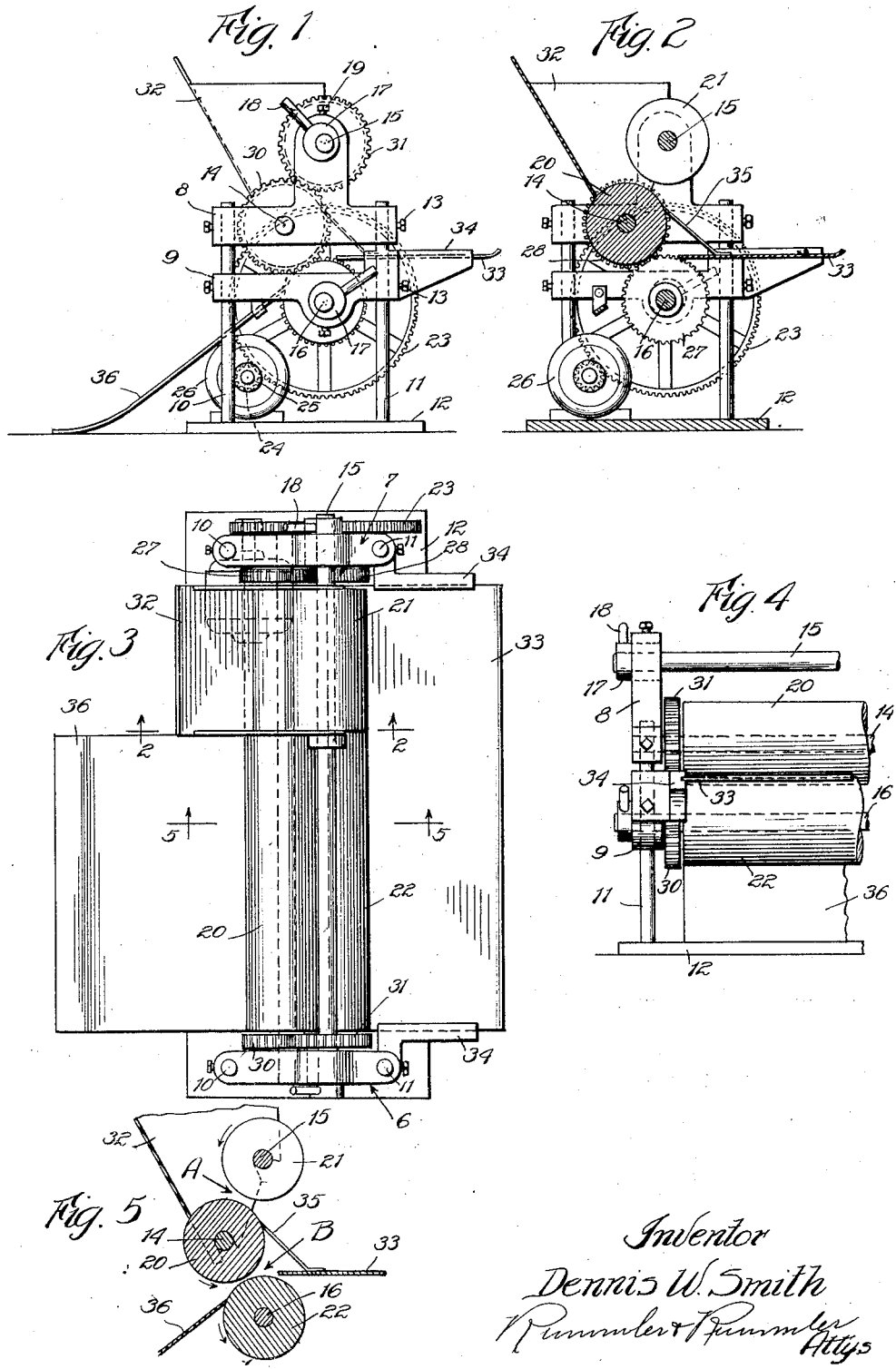
Inventor
Dennis W. Smith
Rummler & Rummler
Attys Patented Sept. 17, 1929

1,728,703

UNITED STATES PATENT OFFICE

DENNIS W. SMITH, OF WILMETTE, ILLINOIS, ASSIGNOR TO COLBORNE MANUFACTURING COMPANY, OF CHICAGO, ILLINOIS, A CORPORATION OF ILLINOIS

DOUGH ROLLER

Application filed January 30, 1928. Serial No. 250,473.

This invention relates to improvements in dough rolling machines, especially for rolling pie crusts and the like. In rolling pie crusts a ball or lump of dough containing about the right amount of material for the desired size of crust, is fed by hand through a wide pass between a pair of rollers to flatten the dough, the length of the flattened dough being nearly equal to the diameter of the finished pie crust. The flattened piece of dough is then fed sidewise through a narrow pass where the dough is further flattened into a thin circular sheet.

Since the number of crusts produced by the machine depends largely upon the speed to which the manual feeding operations can be performed, especially in handling the dough at the intermediate stage, dough rolling machines have been built in the past with two pairs of rollers, arranged one above the other, and at right angles to each other. When the dough was rolled out of the first pass between the upper rollers, it was received on an apron in front of the second pair of rollers, with the result that the operator was only required to flip the dough sidewise into the narrow pass to finish the crust. Such machines were quite expensive to build, and required considerable space. Accordingly cheaper machines were designed which had a single main roller with two shorter rollers arranged side by side above the main roller, to form, in conjunction with the main roller, a wide and a narrow pass. The operator was then required to turn the dough and lift it up over the rollers to feed it through the second pass. It is obvious that such an operation was rather difficult and fatiguing and that a high rate of production could not be obtained.

In this invention a main roller is provided with a small roller above one end for forming the wide pass, and another roller below the other end of the main roller for forming the narrow pass, so that the operator is only required to pull and turn the dough at the intermediate feeding operation.

An illustrative embodiment of this invention is shown in the accompanying drawings, in which:

Fig. 1 is a front elevation of the machine, looking from the operator's position.

Fig. 2 is a section taken on the line 2—2 of Fig. 3.

Fig. 3 is a plan view of the machine.

Fig. 4 is a side elevation of the front portion of the machine.

Fig. 5 is a section taken on the line 5—5 of Fig. 3.

In the construction shown in the drawing, the end frames 6 and 7 each consist of the bearing members 8 and 9 which are mounted on posts 10 and 11 which are secured in the ends of the rectangular base plate 12. The members 8 and 9 are slidable, one above the other, on the posts 10 and 11, and are secured in the proper vertical position by means of suitable fastenings, such as the set screws 13.

The shafts 14 and 15 are rotatably mounted at their ends in the bearing members 8, and shaft 16 is rotatably mounted in the lower bearing members 9. The shaft 14 is fixed in position, and the shafts 15 and 16 are adjustable in relation to the shaft 14, the adjustment being accomplished by means of eccentric bushings 17, which are inserted in the respective bearing members. The bushings 17 are provided with handles 18 for manipulation, and are locked in the desired position by any suitable means, such as the set screws 19.

The main roller 20 is keyed on the shaft 14, and extends entirely across the machine between the end frames. On the rear portion of the shaft 15 is mounted a short roller 21 which cooperates with the rear portion of the main roller 20 to form the wide pass A, as is more clearly shown in Fig. 5; and the roller 22, for forming the narrow, or finishing pass B, is mounted below the main roller 20, on the shaft 16. Preferably the shafts 15 and 16 are each offset at an angle of about 25 degrees to the right of the main roller shaft 14, so that the dough can be more easily fed between the rollers.

The driving arrangement is as follows: on the rear end of the shaft 16, which projects beyond the frame 7, is keyed a large gear wheel 23 which is driven by the pinion 24 which is mounted on the shaft 25 of the motor 26, the motor being mounted on the base plate 12. Motion is communicated from the shaft 16 to the shaft 14 by the equal sized gears 27 and 28 which are keyed respectively to the shafts 16 and 14, and the motion is communicated from the shaft 14 to shaft 15 by the equal sized gears 30 and 31 which are keyed to the shafts 14 and 15 respectively. By this arrangement the rollers are driven at the same speed, the dough is rolled to the right through the pass A, and back to the left through the pass B.

At the left of the roller 21 is provided a hopper 32 for receiving the ball of dough, and guiding it through the pass A. The hopper 32 may be hung on the shafts 14 and 15 as shown, or fixedly mounted in any suitable manner. At the right side of the machine is provided a shelf 33 which, in the construction shown, is removably mounted in suitable brackets 34 which are formed integrally with the lower frame bearing members 9. The scraper blade 35 is rigidly secured at one end to the shelf 33, so that the opposite end bears on the surface of the roller 20, to free the dough from the roller and to guide the dough on to the shelf 33. At the left side of the machine, the dough is rolled out through the narrow pass onto an apron 36, which may be suitably supported so that the upper end serves for scraping the dough from the surface of the lower roller 22.

In using the machine, the operator throws the ball of dough into the hopper 32 which guides the dough through the wide pass A, the dough being rolled out to the right side of the machine onto the shelf 33, the operator then pulls the dough towards the front of the machine, turning it and feeding it to the left through the narrow pass B, through which it is rolled out onto the apron 36 in finished form. In cleaning the machine, the hopper, shelf, and apron may be removed leaving the rollers exposed.

Obviously the construction of the machine is very simple, and the machine can be produced at a low cost so that it is available to a great number of users. The feeding operations are very simple, and can be performed at a high rate of speed. The necessary adjustments can be easily accomplished, and the parts can be easily removed for cleaning. While but one illustrative embodiment of this invention has been shown and described, many alterations and omissions may be had without departing from the spirit of the invention, as defined in the following claims.

I claim:

1. In a dough rolling machine, a main roller, a roller arranged above one end of the main roller to form a wide pass for flattening the ball of dough, and a roller arranged below the other end of the main roller to form a narrow pass for rolling the flattened dough from the wide pass into a thin circular sheet.

2. In a dough rolling machine a main roller, a roller arranged above one end of the main roller to form a wide pass, a roller arranged below the other end of the main roller to form a narrow pass, a hopper mounted at one side of the main roller for guiding the dough into the wide pass, and a shelf at the opposite side of the main roller for receiving the dough from the wide pass and for use in transferring the dough into the narrow pass.

3. A dough forming machine comprising a frame, a main roller journaled in said frame, a roller arranged above one portion of said main roller in laterally offset relation thereto for effecting one operation on the dough passed therebetween, a roller arranged below a different portion of said main roller in laterally offset relation thereto for effecting another operation on said dough, a shelf for receiving said dough after said first operation and for facilitating placement thereof for the second operation, and an inclined apron engaging said last-mentioned roller for removing and conveying the dough therefrom.

Signed at Chicago this 27th day of January, 1928.

DENNIS W. SMITH.